United States Patent [19]

Linstromberg et al.

[11] Patent Number: 4,688,393
[45] Date of Patent: Aug. 25, 1987

[54] POWER SWITCH AND BAFFLE ASSEMBLY FOR A REFRIGERATOR

[75] Inventors: William J. Linstromberg, Lincoln Township, Berrien County; Donald E. Janke, Benton Township, Berrien County, both of Mich.

[73] Assignee: Whirlpool Corporation, Del.

[21] Appl. No.: 870,328

[22] Filed: Jun. 3, 1986

[51] Int. Cl.[4] .............................................. F25D 17/04
[52] U.S. Cl. ......................................... 62/187; 62/180
[58] Field of Search .................. 62/187, 180, 186, 408

[56] References Cited

U.S. PATENT DOCUMENTS

| | | | |
|---|---|---|---|
| 1,952,350 | 3/1934 | Armstrong | 236/76 |
| 2,778,197 | 1/1957 | Legeza et al. | 62/4 |
| 3,058,724 | 10/1962 | Maudlin | 257/278 |
| 3,332,475 | 7/1967 | Selhost et al. | 165/16 |
| 3,645,108 | 2/1972 | Houk | 62/187 |
| 3,975,669 | 8/1976 | Tyler | 318/624 |
| 4,282,720 | 8/1981 | Stottmann et al. | 62/187 |

FOREIGN PATENT DOCUMENTS

| | | | |
|---|---|---|---|
| 0133665 | 10/1979 | Japan | 62/187 |
| 0133666 | 10/1979 | Japan | 62/187 |

Primary Examiner—Harry Tanner
Attorney, Agent, or Firm—Lowe Price LeBlanc Becker & Shur

[57] ABSTRACT

The baffle for controlling flow of chilled air through the divider wall between the frozen food and fresh food compartments of a refrigerator is coupled to a motor driven cam which indexes the baffle open or closed in response to commands from a conventional control unit. Electrical switches positioned around the control surface of the cam, actuated successively during rotation of the cam, operate the compressor, evaporator fan and defrost heater synchronously with the baffle to maintain the frozen food and fresh food compartments at desired temperatures and to control defrosting.

29 Claims, 13 Drawing Figures

POWER SWITCH AND BAFFLE ASSEMBLY FOR A REFRIGERATOR

BACKGROUND OF THE INVENTION

1. Field of the Invention

This invention relates generally to baffle and switch control in a refrigerator, and more particularly, to a unitary baffle and switch control assembly that is motor driven in a response to frozen food and fresh food compartment temperatures and to defrost commands.

2. Summary of the Invention

In typical domestic refrigerators, a fresh food compartment and frozen food compartment separated from each other by a divider wall are cooled by a common compressor-condenser-evaporator system. The frozen food compartment is chilled to sub-freezing temperatures by a fan forcing air past the evaporator in the compartment. The fresh food compartment in turn is cooled by chilled freezer compartment air passing through a baffle in the divider wall.

Commonly, the temperature of the frozen food compartment is controlled directly by thermostat or microprocessor based cycling of the compressor to bring the frozen food compartment to its temperature set point. The temperature of the fresh food compartment in turn is controlled indirectly by operating the baffle to pass chilled frozen food compartment air through the divider wall into the fresh food compartment. When either compartment requires cooling, the evaporator fan is operated. During defrost, a defrost heater associated with the evaporator is energized and the baffle is closed.

Prior art controls require a baffle that is solenoid or bellows operated and further require relays or triacs to operate the compressor, fan and defrost heater. These controls accordingly are relatively complex, expensive and prone to failure. Furthermore, the continuous energization of relays or triacs whenever a load is energized adds undesirable heat to the compartment in which the devices are located. This heat must be removed by the refrigeration system, requiring yet an additional expenditure of energy. There currently exists a need to simplify and make more reliable and efficient the control of compartment temperatures and defrost operation in refrigerators.

In accordance with the invention, temperature control in multiple compartment refrigerators is simplified and made more reliable by a unitary control assembly comprising a cam mechanism that is linked to the baffle and has a profiled control surface adjacent a number of electric switches for operating the compressor, evaporator fan and defrost heater. As the cam is rotated by an electric motor to predetermined angles of rotation in response to output commands from a microprocessor or other control device, the baffle is indexed between its open and closed positions and the switches operated to defrost the frozen food compartment and cool the two compartments to the desired temperatures.

In accordance with another aspect of the invention, the baffle comprises a stationary baffle plate formed with an array of through slots together with a movable baffle plate having a corresponding array of through slots. The two plates are retained in parallel with each other, whereby sliding of the moveable plate across the stationary plate indexes the baffle open or closed. The movable baffle plate is formed with a T-shaped slot which is coupled to a pin formed on the cam at a position offset from its center of rotation. With the compressor, evaporator fan and defrost heater switches spaced circumferentially around the control surface of the cam, operation of the switches and baffle is synchronized to provide the desired frozen food and fresh food compartment temperatures as the cam is rotated by the cam motor.

In accordance with another aspect of the invention, the positions of the compressor, evaporator fan, and defrost heater switches around the perimeter of the cam are chosen to facilitate flexible operation of the unitary control assembly to energize whatever device is required by the conditions sensed within the refrigerator compartments. Most advantageously, this flexibility of operation is accomplished without imposing any unnecessary loads e.g., on the compressor, even temporarily, while the cam is being rotated from one position to another. Such unnecessary loads are particularly onerous in the case of a refrigeration compressor which will become overstressed if not provided a minimum off period between periods of operation.

In accordance with yet another aspect of the invention, a unitary control assembly that is capable of energizing the compressor, evaporator fan and defrost heater of a refrigerator is provided that will dissipate substantially no heat energy while energizing these devices. The only time that the control assembly dissipates heat energy is when the cam motor is energized to make a change in operating states of the refrigerator.

Accordingly, one object of the invention is to provide an improved baffle and switch control in a multiple compartment refrigerator that is economically produced and reliably operated.

Another object is to provide a unitary control assembly for efficiently operating the compressor, evaporator fan, defrost heater and baffle in a multiple compartment refrigerator.

A further object is to provide a unitary control assembly in a refrigerator for establishing desired frozen food and fresh food temperatures by operating the baffle, compressor and evaporator fan synchronously in response to commands from a separate control unit.

Other objects and advantages of the present invention will become apparent from the following detailed description thereof made with reference to the accompanying drawings which form a part of the specification.

DESCRIPTION OF THE PREFERRED EMBODIMENT

Figure 1:
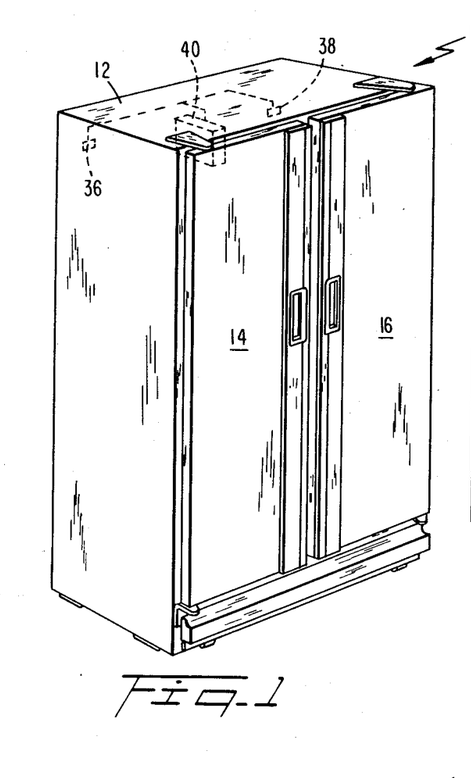
FIG. 1 is a perspective view of a refrigerator having the improved control therein.
Figure 2:
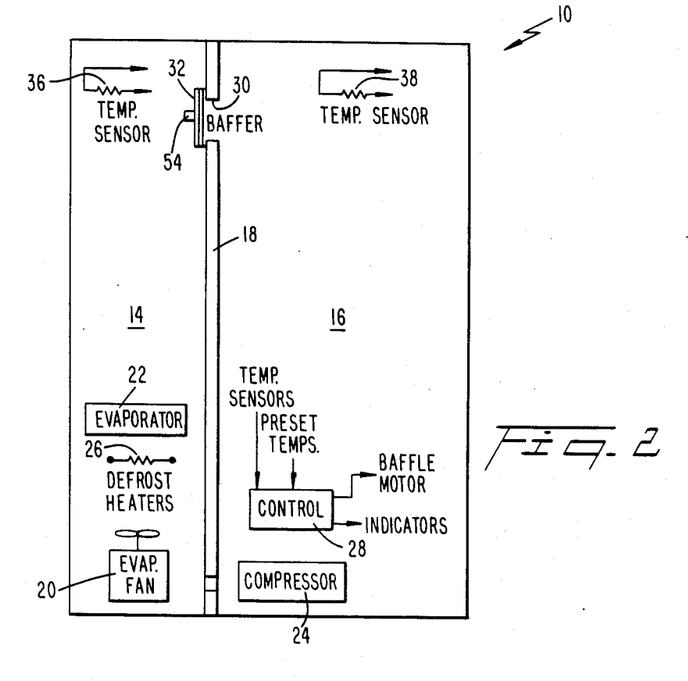
FIG. 2 is a front view of the refrigerator with temperature sensors, defrost heater and refrigeration components shown schematically.

Referring to FIGS. 1 and 2, a refrigerator 10 embodying the invention comprises a cabinet 12 having a frozen food storage compartment 14 and a fresh food cooling compartment 16 separated by a divider wall 18 (FIG. 2). The frozen food compartment 14 is cooled by air moved by a blower or fan 20 past an evaporator 22 which is chilled by a compressor 24. Within the frozen food compartment 14 is a defrost heater 26 to defrost the evaporator periodically under the control of a control unit 28 which preferably is a microprocessor-based control. The structure of the refrigerator cabinet 12 and the defrost heater 26, and the operation of the evaporator-compressor-fan 20, 22, 24 refrigeration system, being conventional, are not described in detail herein. Also known in the prior art are microprocessor-based refrigerator controls capable of generating the appropriate refrigerator control signals, e.g., U.S. Pat. No. 4,481,785, assigned to the assignee of this invention and incorporated by reference herein.

Within the divider wall 18 is an opening 30 to permit chilled air from the frozen food compartment 14 to pass into the fresh food compartment 16. A baffle 32 mounted at the divider wall opening 30 is controlled by a baffle motor 34 to index the baffle selectively between its open and closed positions. The control 28 controls the operation of baffle motor 34, which enables control of evaporator fan 20, compressor 24 and baffle 32 in response to the temperatures of the frozen food compartment 14 and fresh food compartment 16 and corresponding user preset temperatures. The temperatures as will appear of the frozen food and fresh food compartments are respectively measured by temperature sensors 36, 38, which may be conventional thermistors. Corresponding user preset temperatures are provided to control 28 by conventional manual controls (not shown). Defrost heater 26 is also energized by baffle motor 34 under the control of control unit 28, as required.

When the temperature of the frozen food compartment 14, measured by temperature sensor 36, is above a user preset frozen food compartment temperature, whereby the frozen food compartment requires cooling, the baffle 32 is closed and compressor 24 and evaporator fan 20 are turned on to chill the compartment. When the fresh food compartment temperature, measured by temperature sensor 38, is above a user preset temperature so that the fresh food compartment requires cooling, the baffle 32 is opened and the evaporator fan 20, but not the compressor 24, is turned on. When both the frozen food compartment 14 and fresh food compartment 16 require cooling, the baffle 32 is opened and both the evaporator fan 20 and the compressor 24 are turned on. During defrost, the baffle 32 is closed and the defrost heater 26 is energized; the evaporator fan 20 and compressor 24 are turned off.

Thus, whatever the current refrigeration requirement at any particular time, i.e., (1) cool frozen food compartment 14, (2) cool fresh food compartment 16, (3) cool both or (4) defrost, operation of the evaporator fan 20, compressor 24 and defrost heater 26 are synchronized with operation of the baffle 32.

Figure 3:
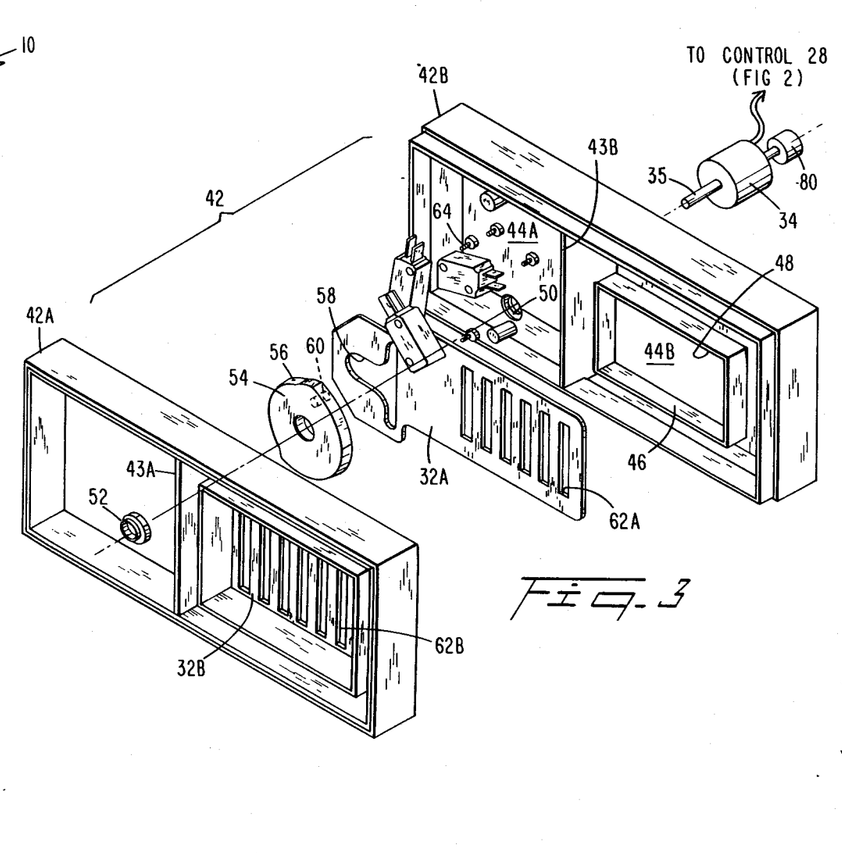
FIG. 3 is an exploded view of a unitary baffle and switch control assembly provided in accordance with the invention.
Figure 4:
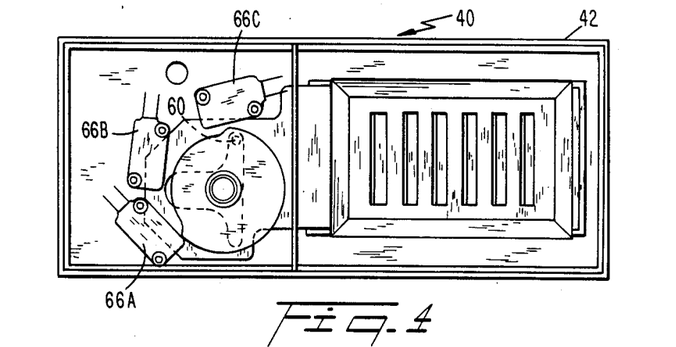
FIG. 4 is a front view of the control assembly with its cover removed to expose the baffle and switches therein.

In accordance with the invention, a unitary baffle and electrical switch assembly 40, shown in FIGS. 3 and 4, receives control signals from control unit 28 and, in response, controls the position of the baffle 32 and the electrical state of the fan, compressor and heater switches. This is an improvement over the prior art, wherein separate control units to operate the baffle 32 and energize the evaporator fan 20, compressor 24 and defrost heater 26 are required.

Referring to FIG. 3, unitary control assembly 40 comprises a plastic housing 42 formed of a pair of half-housing portions 42A, 42B that interfit at a circumferential lip on portion 42B. The two housing portions 42A and 42B are each divided approximately mid-way by integral walls 43A, 43B defining electrical switch and baffle sections 44A, 44B, respectively.

The baffle section 44B has a rectangular opening 46, circumscribed by a wall 48. The opening 46 permits flow of chilled air from the frozen food compartment 14 to the fresh food compartment 16 when the baffle and switch assembly 40, is mounted to divider wall 18 at opening 30 (FIG. 2) is operated.

Apertures 50 and 52 in housing portions 42B, 42A journal the shaft 35 of baffle motor 34. A cam 54, having a profiled control surface 56, is mounted on and keyed to rotate with the shaft 35 within switch section 44A of the assembly 40. The cam motor shaft 35 extends through a T-shaped slot 58 formed in a generally rectangular, movable baffle plate 32A that traverses the baffle section 44B. A pin 60 extending from one side of the cam 54 adjacent control surface 56 is also retained within the T-shaped slot 58 in movable baffle plate 32A.

Figure 5A:
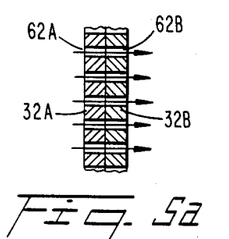
FIGS. 5A and 5B are partial cross sectional views of the baffle in its open and closed positions, respectively.
Figure 5B:
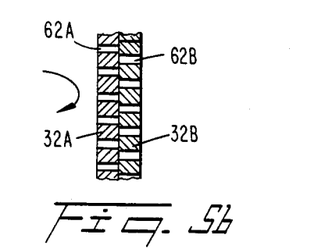

The movable baffle plate 32A contains a series of parallel openings 62A to permit the flow of chilled air from the frozen food compartment 14 therethrough. A corresponding series of slots 62B is provided on a stationary baffle plate 32B of the housing portion 42A. With the two housing portions 42A, 42B joined to each other, the movable baffle plate 32A is slidably retained between the stationary baffle plate 32B in housing portion 42A and wall 46 of housing section 42B. Thus, as cam 54 is rotated, the movable baffle plate 32A indexes longitudinally between an open position (FIG. 5A) with openings 62A, 62B in registration with each other and a closed position (FIG. 5B) with the openings out of registration with each other.

Also formed within switch section 44A are a number of mounts 64 for securing therein three electrical switches 66A, 66B and 66C (FIG. 4) which preferably are standard microswitches. With the assembly 40 assembled, the three microswitches 66A-C are spaced circumferentially around the control surface 56 of cam 54 whereby, as the cam rotates, the switches are operated successively by the profiled control surface of the cam. Correspondingly, as the cam 54 rotates, the movable baffle plate 32A is indexed between its open and closed positions.

Figure 6:
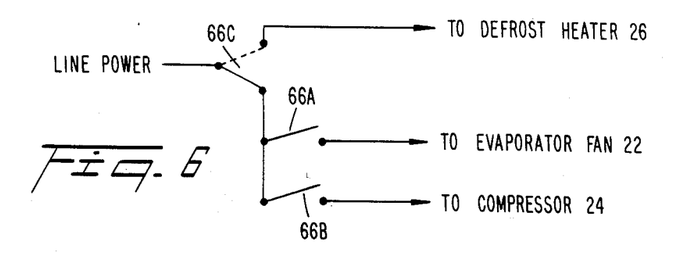
FIG. 6 is a simplified switching diagram for energizing the compressor, evaporator fan and defrost heater.

Referring to FIG. 6, switch 66A controls the flow of electrical power to evaporator fan 20 and switch 66B supplies power to the compressor 24; the switch 66C, in turn, supplies electrical power to either defrost heater 26 or switches 66A, 66B. Whereas switches 66A and 66B are single pole, single throw switches, switch 66C is a single pole, double throw switch. Thus, with switch 66C in the rest position shown by the solid line in FIG. 6, actuation of switches 66A and 66B controls the evaporator fan 20 and compressor 24, respectively, with defrost heater 26 turned off. With switch 66C in the actuated position shown by the dotted line in FIG. 6, on the other hand, only the defrost heater 26 is energized; fan 20 and compressor 24 are turned off.

Of particular importance, the control surface 56 of cam 54 is profiled, and the extending pin 60 of the cam is coupled to the movable baffle 32A so as to synchronize operation of the three switches 66A-C to each other and to the indexing of the baffle between its open and closed positions in the following five modes of operation: (1) quiescent, (2) cool fresh food compartment only, (3) cool frozen food compartment only, (4) cool both frozen food and fresh food compartments and (5) defrost.

The states of the baffle 32 and switches 66A–66C in the five operating positions of cam 54 are summarized in Table I below:

TABLE I

| POSITION | BAFFLE | SW 66A | SW 66B | SW 66C |
|---|---|---|---|---|
| 1 QUIESCENT | Closed | Rest | Rest | Rest |
| 2 REFR ONLY | Open | Actuated | Rest | Rest |
| 3 FRZ ONLY | Closed | Actuated | Actuated | Rest |
| 4 REFR & FRZ | Open | Actuated | Actuated | Rest |
| 5 DEFROST | Closed | * | * | Actuated |

*Irrelevant

Figure 7A:
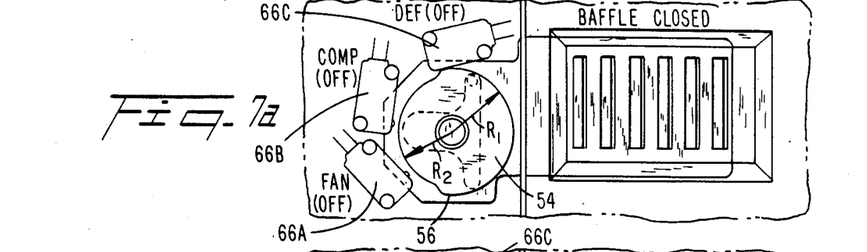
FIGS. 7A–7E show five positions of the control assembly of the invention for controlling the baffle and switches to establish the desired compartment temperatures and perform the defrost operation.

Operation of the baffle and switch assembly 40 in the five operating positions (1)-(5) of cam 54 is set forth in FIGS. 7A-7E, respectively. Referring first to FIG. 7A, the control surface 56 of cam 54 is essentially circular with a first circumferential portion of a radius R1 and a second circumferential portion of a smaller radius R2. The cam 54 is positioned initially with its smaller radius portion R2 in presentation to switches 66A–66C whereby the switches are all at rest, and with the extending pin 60 at approximately a one o'clock position. With the cam 54 rotatably oriented as shown in FIG. 7A, the moveable baffle plate 32A is out of registration with stationary baffle plate 32B, whereby the baffle is closed.

In response to an appropriate signal from control 28, the cam 54 is rotated clockwise (FIG. 7B) to cool the fresh food compartment 16. The portion R1 of cam 54 actuates switch 66A to turn the evaporator fan 20 on. Switches 66B and 66C are at rest, and the movable baffle plate 32A is indexed longitudinally, as shown by the arrow, to open the baffle. Pin 60 is at approximately a two o'clock position.

To cool the frozen food compartment, the cam 54 is further rotated clockwise (FIG. 7C) to actuate switches 56A and 56B, energizing the evaporator fan 20 and compressor 24. Rotation of the cam from the position shown in FIG. 7B to that shown in FIG. 7C positions pin 60 at approximately a three o'clock position which further indexes the movable baffle plate 32A longitudinally until the baffle openings 62a, 62b are again out of registration with each other to close the baffle. It is important that the cam 54 now be positioned with its extending pin 60 centrally within baffle slot 58 to insure that the baffle 32 is fully closed.

Figure 7B:
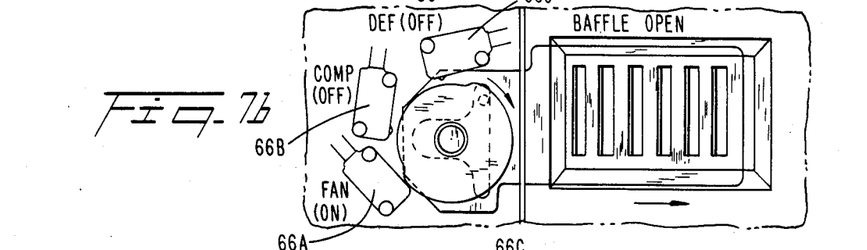
Figure 7C:
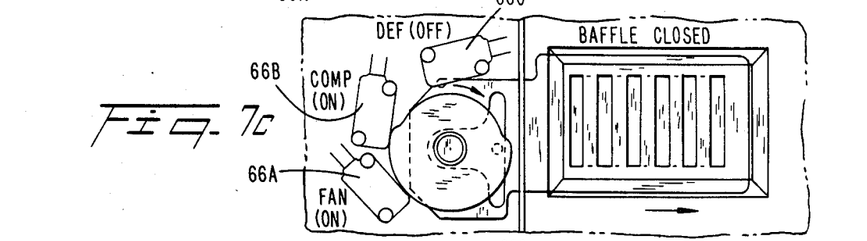
Figure 7D:
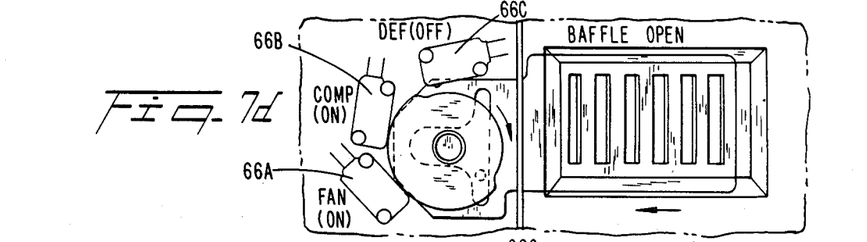

To now cool both the frozen food and fresh food compartments 14, 16, the cam 54 is further rotated clockwise into the position shown in FIG. 7D. With fan switch 66A and compressor switch 66B maintained in their actuated states by the control surface 56 of cam 54, rotation of the cam is terminated before the cam actuates defrost switch 66C. The movable baffle plate 32A has, however, been indexed back toward the cam 54 by pin 60 rotating to an approximate four o'clock position to open the baffle 32.

Figure 7E:
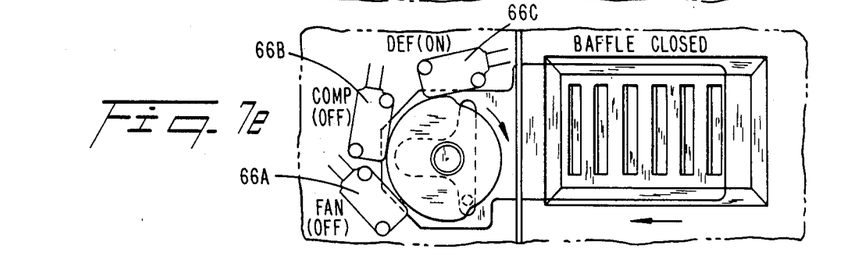

Finally, to defrost the refrigerator, the cam 54 is further rotated clockwise to the position as shown in FIG. 7E, with defrost heater switch 66C actuated, which energizes the defrost heater and removes power from switches 66A and 66B which hence deenergizes the compressor and evaporator fan. The baffle 32A is indexed further back toward cam 54 by pin 60 rotating to an approximate five o'clock position to close the baffle.

Although the cam 54 is rotated unidirectionally between positions among successive refrigeration modes in the above example (FIGS. 7A-7E), the cam, in practice, is rotated bidirectionally among its five rotational positions to carry out the appropriate operation of the baffle and refrigeration components, in response to commands issued by control 28, while avoiding closing of any of the switches 66A–66C unnecessarily.

For example, if the refrigerator is quiescent and the frozen food compartment needs cooling, cam 54 will be rotated from the FIG. 7A position to the FIG. 7C position which will first energize the evaporator fan and then the compressor. However, the defrost heater is not even momentarily energized.

Similarly, if cam 54 is in the FIG. 7D position and the frozen food compartment no longer is in need of cooling, the cam 54 will be rotated to the FIG. 7B position which will merely deenergize the compressor while leaving the evaporator fan energized. When the desired temperature adjustment of the fresh food compartment is thus obtained, the cam will be rotated to the FIG. 7A position deenergizing the evaporator fan.

In its preferred form, the invention will be used in conjunction with a control 28 of the type which establishes the need for a defrosting operation on an accumulation of compressor run time or otherwise requires that the compressor be energized at the time that a defrost signal is generated. As such, the cam 54 will necessarily be in either the FIG. 7C or FIG. 7D position when defrosting is demanded. Movement of the cam to the FIG. 7E position will deenergize the compressor and the evaporator fan simultaneously with energization of the defrost heater. But, again, no loads are unnecessarily energized.

Even if the invention is utilized with a control 28 that will allow a defrost command to be generated without requiring that the compressor be energized, the worst case is that the compressor will be momentarily energized while the cam moves from either the FIG. 7A or FIG. 7B position to the FIG. 7C position. While this is a wasteful use of energy it is not particularly detrimental to the compressor.

Following a defrost operation, at least the frozen food compartment will require cooling because the defrosting of the evaporator takes place in this compartment. Cam 54 will be rotated from the FIG. 7E position to either the FIG. 7C or FIG. 7D position depending on the need of the fresh food compartment for cooling. When the needs of the frozen food compartment are satisfied, the cam will be rotated to the FIG. 7B or FIG. 7A position. Once again, it is seen that no loads are unnecessarily energized.

Operation of cam motor 34 for indexing cam 54 to the proper positions to maintain the frozen food and fresh food compartment temperatures at the user-selected temperatures and to provide periodic defrosting is, as mentioned, determined by refrigerator control unit 28.

Figure 8:
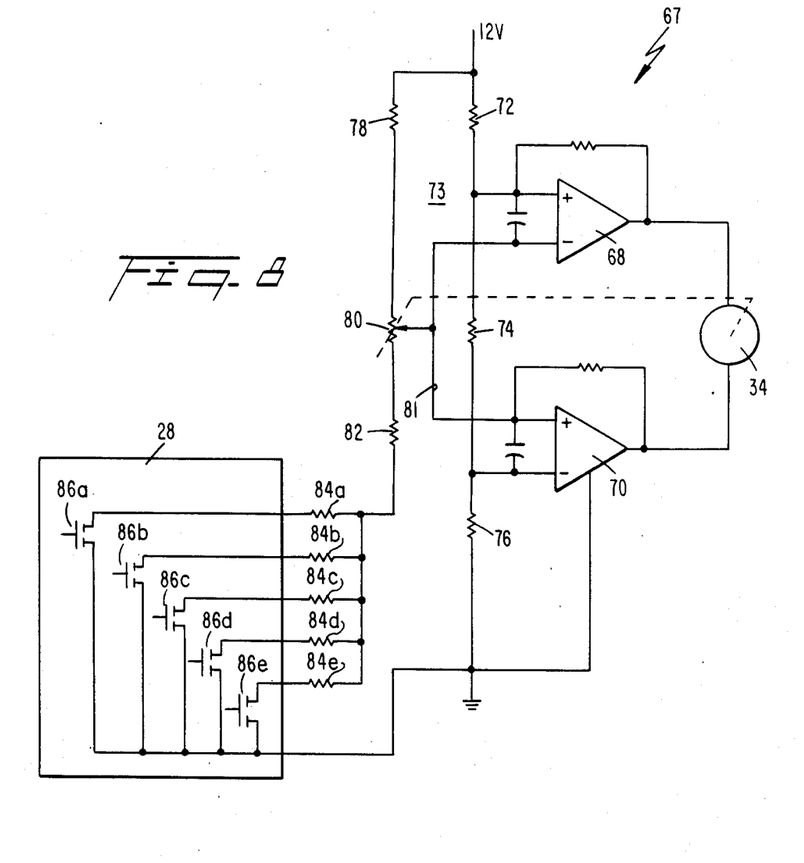
FIG. 8 is a circuit diagram of a cam motor driver for controlling the cam to assume the positions of FIGS. 7A-7E.

Signals generated by the control unit 28 drive cam motor 34 to the proper positions by a cam motor driver circuit 67, shown in FIG. 8. The circuit 67 comprises a pair of amplifiers 68, 70 connected to opposite nodes of a resistor bridge 73. The bridge 73 consists of a pair of resistance dividers formed, respectively, by resistors 72, 74 and 76 and by resistor 78, feedback potentiometer 80, resistor 82 and control resistors 84a–84e. The feedback potentiometer 80 is coupled mechanically to the shaft of cam driver motor 34.

Each of control resistors 84a–84e is connected to an output port of the control unit 28 and is, in turn, connected to ground by one of the output switching devices 86a–86e. The switching devices 86a–86e are conventional and are under control of the logic portion (not shown) of control 28. The devices 86a–86e are individually energized depending on the state of the logic in the control unit as is well known in the art. Energization of one of the switching devices 86a–86e will cause the corresponding control resistor 84a–84e to be operatively connected in bridge 73.

Due to the presence of resistor 74, the (+) input of amplifier 68 is always at a higher potential than the (−) input of amplifier 70. The (−) input of amplifier 68, the (+) input of amplifier 70 and the wiper of potentiometer 80 are electrically coupled at node 81 and, therefore, are all at the same potential. When the potential at node 81 is greater than the (−) input of amplifier 70 but less than the amplifier 68 (+) input, the outputs of both amplifiers 68, 70 are high causing motor 34 to be idle. When one of the switching devices 86a–86e places a corresponding lower resistance value resistor 84a–84e into bridge 73, the potential at node 81 is reduced below the value of the (−) input of amplifier 70, causing the output of amplifier 70 to go low. Motor current now flows from amplifier 68, through motor 34, to amplifier 70, rotating the motor 34 until it drives the wiper of potentiometer 80 to a position to rebalance the bridge 73.

When one of the switching devices 86a–86e places a corresponding greater resistance value resistor 84a–84e into bridge 73, the increased potential at node 81 will cause amplifier 68 to go low, driving cam motor 34 in the opposite direction until potentiometer 80 again rebalances the bridge 73.

The values of resistors 84a–84e are selected to cause the cam 54, driven by cam motor 34, to index to the corresponding positions shown in FIGS. 7a through 7e under the control of control unit 28.

There has accordingly been described a preferred embodiment of a unique, unitary baffle and switch control assembly for a refrigerator that is inherently simpler and more reliable than multiple control units of the prior art to provide the same refrigerator control functions. It should be apparent to those skilled in the art that the embodiment described herein may be practiced in other ways without departing from the spirit of the invention. For example, although the movable baffle plate and cam are described as separate members, the invention comprehends the combination of these into one movable baffle plate with an edge defining the control surface to actuate linearly spaced stationary switches synchronously with the baffle member as it is selectively positioned.

What is claimed is:

1. In a refrigerator having a cabinet defining a first compartment and a second compartment separated from each other by a divider wall, first compartment and second compartment temperature sensors, air passage means for communicating between said compartments, cooling means operable for selectively cooling said compartments and control means responsive to sensed respective temperatures of said compartments for producing a control signal indicative of the need to selectively cool said compartments to predetermined respective temperatures thereof, a baffle and switch assembly, comprising:

baffle means positioned within said air passage means and indexable to selectively open and close said air passage means;

motor means responsive to said control signal for indexing said baffle means; and coupling means for coupling said baffle to said motor means, said coupling means defining a movable control surface;

switch means in said switch assembly, operative in response to the position of said control surface, for operating said cooling means;

said switch means being positioned with respect to said control surface such that indexing operation of said motor means in response to said control signal operates said switch means synchronously with said baffle to selectively cool said compartments.

2. The apparatus of claim 1, wherein said control surface comprises a separate cam.

3. The apparatus of claim 1, wherein said switch means includes first and second electrical switches connected to said cooling means, and said cooling means comprises a compressor and an evaporator fan controlled respectively by said first and second electrical switches.

4. The apparatus of claim 2, wherein said control surface is essentially circular and said switch means includes a plurality of electrical switches, respectively connected to said cooling means, spaced circumferentially around the control surface.

5. The apparatus of claim 4, wherein said cooling means comprise a compressor, an evaporator fan and a defrost heater, and wherein said switch means includes first, second and third electrical switches spaced circumferentially around the control surface and controlling, respectively, the compressor, the evaporator fan and the defrost heater.

6. The apparatus of claim 3, further including temperature sensing means for generating outputs corresponding to the respective temperatures of said first and second compartments, and wherein said control means is responsive to said outputs of said temperature sensing means and said control signal is indicative of the need to cool at least one of said first and second compartments.

7. The apparatus of claim 2, wherein said cam is rotatable on an axis of rotation and said motor means rotates said cam among a plurality of discrete angles of rotation.

8. The apparatus of claim 5, wherein said first and second compartments are, respectively, frozen food and fresh food compartments, and further wherein said control signal indicates the need to selectively (a) cool only said fresh food compartment, (b) cool only said frozen food compartment, (c) cool both said fresh and frozen food compartments and (d) defrost said refrigerator; and wherein said motor means includes means responsive to said control means signal to move said control surface to positions corresponding respectively to (a)–(d).

9. The apparatus of claim 8, whereinn said motor means is coupled to said baffle and said control surface is shaped such that said motor means in a position (i) opens said baffle and turns said evaporator fan on, in a position (ii) closes said baffle and turns said compressor and said evaporator fan on, in a position (iii) opens said baffle and turns said compressor and said evaporator fan on and in a position (iv) closes said baffle and turns said defrost heater on.

10. The apparatus of claim 1, wherein said baffle comprises a movable baffle plate formed with a plurality of through passages and a stationary baffle plate formed with a like plurality of corresponding through passages and means for slidably retaining said movable baffle plate parallel to said stationary baffle plate such that said through passages in said movable and stationary baffle plates are selectively (a) in registration with each other when said baffle is open and (b) out of registration with each other when said baffle is closed.

11. The apparatus of claim 10, wherein said motor means has a shaft rotatable about an axis of rotation, and said coupling means rotatable therewith includes a pin associated with said shaft and offset from said axis of rotation, the movable baffle plate being formed with an opening for receiving said pin, whereby rotation of said coupling means indexes said baffle between open and closed positions.

12. The apparatus of claim 11, wherein said control surface is a cam rotatably mounted to said shaft and further wherein said baffle plate opening is T-shaped and said pin is attached to said cam member.

13. In a refrigerator having a cabinet defining a frozen food compartment and a fresh food compartment separated from each other by a divider wall, a through opening formed in said wall to enable cold air from said frozen food compartment to flow into said fresh food compartment; a compressor; an evaporator located in said frozen food compartment; an evaporator fan for circulating chilled air within said frozen food compartment and through said opening into said fresh food compartment; a baffle for controlling flow of chilled air through said opening into said fresh food compartment; temperature sensor means for measuring the temperatures of said frozen food and fresh food compartments and control means responsive to said temperature sensor means for producing signals indicative of the need to cool said compartments; a system for controlling said baffle, compressor and evaporator fan to maintain predetermined frozen food and fresh food compartment temperatures comprising:

a cam having a control surface;
electrical switch means operated by movement of said control surface to apply electricity from an external electrical power source selectively to said compressor and said evaporator fan;
means for coupling said cam to said baffle;
and motor means responsive to said signals for moving said cam;
the control surface of said cam being shaped and said coupling means interconnecting said cam and said baffle such that operation of said electrical switches and said baffle during movement of said cam are synchronized to each other to selectively cool said compartments.

14. The apparatus of claim 13, wherein said baffle comprises a movable plate containing a plurality of through passages and a stationary plate containing a like plurality of corresponding through passages and means for slidably retaining said movable plate to said stationary plate, the baffle being selectively "opened" with the through passages of said movable and stationary baffle plates in registration with each other and "closed" with the through passages of said movable and stationary baffle plates out of registration with each other.

15. The apparatus of claim 14, wherein said cam is rotatable on an axis of rotation and said motor means includes means for rotating said cam among a plurality of predetermined angles of rotation.

16. The apparatus of claim 15, wherein said coupling means includes a pin extending axially from said cam and said movable baffle plate contains a receiving slot for said pin, rotation of said cam indexing said baffle between open and closed positions.

17. The apparatus of claim 16, wherein said receiving slot in said movable baffle plate is T-shaped and said extending pin on said cam is located adjacent said control surface of said cam.

18. The apparatus of claim 13, wherein said refrigerator includes a defrost heater, one of said control signals is indicative of the need to defrost said evaporator, and said electrical switch means includes means for applying electrical power to said defrost heater.

19. The apparatus of claim 18, wherein said switch means includes a plurality of switches spaced circumferentially apart from each other along the control surface of said cam.

20. The apparatus of claim 19 wherein said control signals selectively indicate the need to (a) cool only said fresh food compartment, (b) cool only said frozen food compartment, (c) cool both said fresh and frozen food compartments and (d) defrost said refrigerator; and wherein said motor means includes means responsive to said control signals to move said cam control surface to positions corresponding respectively to (a)–(d).

21. The apparatus of claim 20 wherein said cam is coupled to said baffle and said control surface is shaped such that said cam in a position (i) opens said baffle and turns said evaporator fan on, in a position (ii) closes said baffle and turns said compressor and said evaporator fan on, in a position (iii) opens said baffle and turns said compressor and said evaporator fan on and in a position (iv) closes said baffle and turns said defrost heater on.

22. The apparatus of claim 21 wherein said plurality of switches comprise a first switch connecting electrical power to said evaporator fan when actuated and actuated in positions (i)–(iii), a second switch connecting electrical power to said compressor when actuated and actuated in positions (ii)–(iii) and a third switch connecting electrical power to said first and second switches when nonactuated and connecting electrical power to said defrost heater when actuated, said third switch actuated in position (iv).

23. The apparatus of claim 13 wherein said frozen food compartment and said fresh food compartment are arranged side-by-side and said divider wall is vertically oriented.

24. In a refrigerator having a cabinet defining a frozen food compartment and a fresh food compartment separated from each other by a divider wall, a through opening in said wall to enable cold air from said frozen food compartment to flow into said fresh food compartment; a compressor; an evaporator; an evaporator fan for circulating chilled air within said frozen food compartment and through said opening into said fresh food compartment; defrost means to defrost said evaporator; temperature sensing means for measuring the temperature of said frozen food and said fresh food compartments; and control means responsive to said temperature sensing means for producing control signals indicative of the need to cool said compartments and to defrost said evaporator; a power switch and baffle assembly comprising:
- a housing defining a first portion and a second portion,
- said housing first portion overlying said wall opening and having a plurality of through passages therein,
- a baffle plate having a plurality of through passages and slidably retained in said housing overlying said housing through passages,
- said baffle plate having an edge defining a T-shaped slot in a portion thereof, said slot portion in said housing second portion,
- a motor mounted to said housing second portion and having a shaft extending through said slot in said baffle plate,
- a cam mounted to said motor shaft and defining a control surface,
- a pin extending axially from said cam into said baffle plate slot to laterally slide said plate between a first "open" position with the through passages in the baffle plate in registration with the through openings in the housing and a second "closed" position with the through passages in the baffle plate out of registration with the through openings in the housing in response to rotation of said cam,
- a plurality of electrical switch means radially spaced around said cam in operative association with the cam control surface,
- indexing means responsive to said control signals for rotating said motor shaft among a plurality of predetermined angles of rotation each corresponding to a change in operative state at one said switch means,
- said switch means electrically connected to selectively operate said compressor, said evaporator fan and said defrost means and said baffle plate movement synchronized with the operative states of said switch means.

25. The assembly of claim 24, wherein said indexing means comprises difference amplifier means responsive to said control signals for applying electricity to said motor means.

26. The assembly of claim 25, wherein said motor means has a pair of input leads connected to an output of said difference amplifier means, said differential amplifier means including means responsive to said control signals for driving said motor means bidirectionally.

27. The assembly of claim 26, including a resistance bridge, and wherein said difference amplifier means comprises first and second difference amplifiers having outputs connected respectively to said input leads of said motor means and having inputs connected to different nodes of said resistance bridge, said difference amplifiers developing output signals in accordance with the voltages developed at the nodes of said bridge.

28. The assembly of claim 27, wherein said resistance bridge includes a potentiometer controlled by said motor means, and one leg of said bridge includes a variable resistor means controlled by said control signals.

29. The assembly of claim 28, wherein said variable resistor means comprises a plurality of resistors each connected in series with a corresponding transistor switch, and means for applying said control signals to said transistor switches.

* * * * *